Nov. 7, 1944.   N. J. PETERS   2,362,090
CHEESE TRIER
Filed Nov. 21, 1942
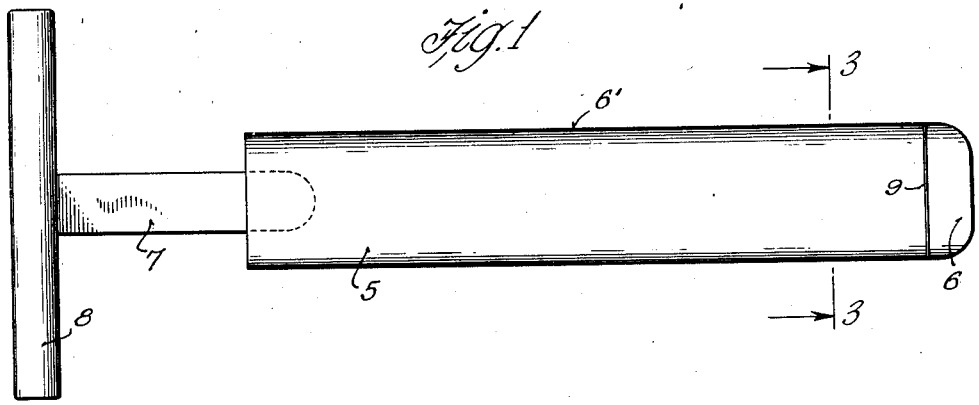
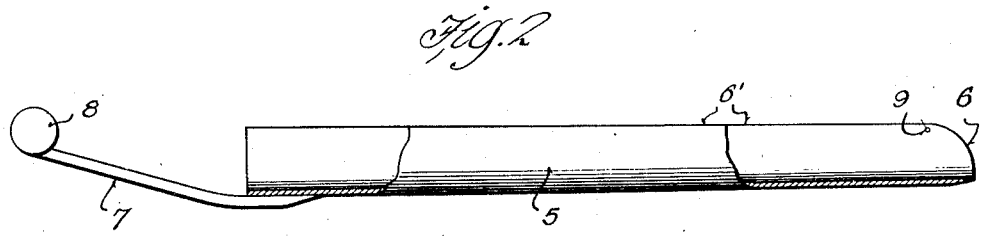
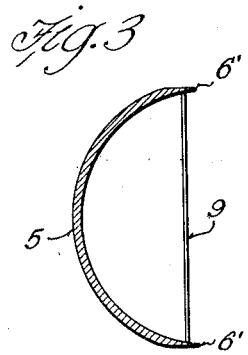   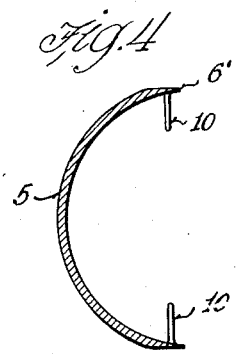
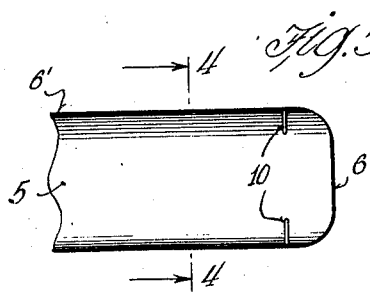
INVENTOR
Norman J. Peters
BY
Marble & French
ATTORNEYS Patented Nov. 7, 1944

2,362,090

UNITED STATES PATENT OFFICE 2,362,090

CHEESE TRIER

Norman J. Peters, Fond du Lac, Wis., assignor to Damrow Brothers Company, Fond du Lac, Wis., a corporation of Wisconsin Application November 21, 1942, Serial No. 466,517

2 Claims. (Cl. 30—115)

The invention relates to cheese triers or samplers.

The ordinary cheese trier comprises a gouge-like member which is adapted to be inserted in a body of cheese to remove a sample therefrom, but with such a device the samples may vary in length because of the breaking off of the cheese at varying distances from the end of the trier. The object of the present invention is to provide a cheese trier which will cut out samples of cheese of definite length, the trier embodying a cutting means at its outer end which cuts in whole or in part the lower end of the sample from the body of the cheese as the trier is given a full rotation.

The invention further consists in the several features hereinafter set forth and more particularly defined by claims at the conclusion hereof.

In the drawing:

Fig. 1 is a plan view of a trier embodying the invention;

Fig. 2 is an elevation view thereof, parts being broken away and parts being shown in section;

Fig. 3 is a detail sectional view of the trier taken on the line 3—3 of Fig. 1;

Fig. 4 is a detail sectional view taken on the line 4—4 of Fig. 5 of a trier showing certain modifications;

Fig. 5 is a detail plan view of a modified form of trier.

Referring to the drawing, the numeral 5 designates a gouge-like body member of metal of substantially semi-tubular form having its outer end curved at 6 and edge portion thinned to form a cutting edge, the inner end having a shank 7 secured thereto for the handle 8. The side edges 6' may also be thinned to form cutting edges.

Adjacent the outer end 6 I mount a cutting means preferably extending from one side to the other of said body and here shown in the form of a relatively small wire 9 suitably anchored as by brazing or welding its ends to the opposite sides of said member, as shown in Fig. 1. This wire may be a relatively fine round wire or a square or polygonal wire of relatively small cross sectional area and is disposed just back of the rounded cutting edge 6 of the member 5. Some advantages may be obtained by securing cutter projections to each side of said body with their ends spaced apart, but the wire is preferred.

In operating the trier, the member 5 is pushed into the cheese and the wire 9 on the end will cut into the cheese, so that a semi-circular incision is made in the cheese. The member 5 is then turned through three hundred sixty degrees to cut out a complete sample of the cheese, the sides of the trier making a cylindrical cut while the wire at the lower end of the trier cuts off the bottom, and then by turning the trier further the wire will help in pulling out the cheese plug which has been cut out of the cheese. When the trier above described pulls out the cheese plug, it is pulled out as one cylindrical plug split in half, and the split sections of the plug can be separated into two semi-circular segments for inspection or testing.

While the transversely extending wire makes a clean cut at the bottom of the sectional plug, its main function is to help pull the plug out from the body of the cheese. Consequently, where as previously noted the cutting means is in the form of projections extending part way across the body member, the plug would not be cut off completely by these projections, but they would merely cut into the cheese, and then when the trier is turned better than one hundred eighty degrees, these projections will help pull out the plug cut out by the body of the trier. Fig. 4 shows the modified form of trier above described in which the numeral 10 designates the cutting projections.

I desire it to be understood that this invention is not to be limited to any particular form or arrangement of parts except in so far as such limitations are included in the appended claims.

What I claim as my invention is:

1. A cheese trier comprising a gouge-like body member for insertion into the cheese to cut out a plug and having rounded sides at its cutting end, and cutting means at the outer end portion of said body member projecting inwardly from points adjacent the top edges of the sides of said member back from its cutting edge to assist in removing the plug.

2. A cheese trier adapted for insertion into a cheese to cut out a plug comprising a gouge-like member with a rounded cutting end and side edges thinned to form cutting edges, and a wire extending across said member and secured to its opposite sides adjacent the rounded parts of said cutting end and the top edges of said sides to cut off the lower end of the plug back from said cutting end on the rotation of said body member and assist in the removal of said plug.

NORMAN J. PETERS.